US008069045B2

(12) United States Patent
Emam et al.

(10) Patent No.: US 8,069,045 B2
(45) Date of Patent: Nov. 29, 2011

(54) HIERARCHICAL APPROACH FOR THE STATISTICAL VOWELIZATION OF ARABIC TEXT

(75) Inventors: Ossama Emam, Giza (EG); Volker Fischer, Leimen (DE)

(73) Assignees: International Business Machines Corporation, Armonk, NY (US); Nuance Communications, Inc., Burlington, MA (US)

( * ) Notice: Subject to any disclaimer, the term of this patent is extended or adjusted under 35 U.S.C. 154(b) by 1534 days.

(21) Appl. No.: 10/948,443

(22) Filed: Sep. 23, 2004

(65) Prior Publication Data

US 2005/0192807 A1    Sep. 1, 2005

(30) Foreign Application Priority Data

Feb. 26, 2004 (EP) .................... 04100749

(51) Int. Cl.
    *G10L 15/14* (2006.01)
(52) U.S. Cl. .................. 704/256; 704/255; 704/9
(58) Field of Classification Search ............ 704/255, 704/256, 9
    See application file for complete search history.

(56) References Cited

U.S. PATENT DOCUMENTS

| | | | |
|---|---|---|---|
| 6,108,627 A * | 8/2000 | Sabourin | 704/243 |
| 6,411,932 B1 * | 6/2002 | Molnar et al. | 704/260 |
| 7,136,816 B1 * | 11/2006 | Strom | 704/260 |
| 2005/0015237 A1 * | 1/2005 | Debili | 704/2 |
| 2006/0107200 A1 * | 5/2006 | Ching | 715/513 |

OTHER PUBLICATIONS

Francois Yvon, Grapheme-to-Phoneme Conversion using Multiple Unbounded Overlapping Chunks, 1996, Proceedings of the International Conference New Methods in language Processing, No. 2, pp. 1-11.*
Simard, M., Automatic Insertion of Accents in French Text 1998, Third Conference on Empirical Methods in Natural Language Processing, pp. 1-9.*
D. Yarowsky, A comparison of corpus-based techniques for restoring accents in Spanish and French text 1999, Kluwer Academic Publishers, pp. 99-120.*

* cited by examiner

*Primary Examiner* — Jakieda Jackson
(74) *Attorney, Agent, or Firm* — Wolf, Greenfield & Sacks, P.C.

(57) ABSTRACT

The present invention relates to the field of computer-aided text and speech processing, and in particular to a method and respective system for converting an input text given in an incomplete language, for example a language, in which unvowelized text is used, into speech, wherein a computer-aided grapheme-phoneme conversion is used. In order to improve completion of the text, it is proposed to
a) use statistical methods including decision trees and stochastic language models for enriching, i.e. completing said input text with missing information—which may be desired for a full understanding of the input text
b) subjecting the completed input text to said grapheme-phoneme conversion to produce synthetic speech.
Advantageously, the text is completed according to a model hierarchy giving higher priority to longer chunks of text, ie sentences (310, 315, 320) then multiword phrases (330, 335, 340), then words (350, 355, 360) and finally character groups (370, 375, 380, 390).

20 Claims, 7 Drawing Sheets

HIERARCHICAL APPROACH FOR THE STATISTICAL VOWELIZATION OF ARABIC TEXT

1. BACKGROUND OF THE INVENTION

1.1. Field of the Invention

The present invention relates to the field of computer-aided text and speech processing, and in particular to a method and respective system for converting an input text given in an incomplete language, into speech, wherein a computer-aided grapheme-phoneme conversion is used.

1.2. Description and Disadvantages of Prior Art

The term "incomplete" language used herein shall be understood to be a language, which does not necessarily contain a complete syntactic description of phrases in its textual representation. Good examples are the "natural" semitic languages (such as Arabic and Hebrew), in which written text often lack vowels. Other examples are "artificial" languages, which may be used to abbreviate complete text.

The present invention will thus be defined from prior art by aid of the Arabic language, as it can be very advantageously applied to the processing of Arabic, a member of the family of Semitic languages, that does only occasionally make use of vowels when written.

1.2.1 Introduction to Arabic Language

Arabic is one of the Semitic languages and is an important language to religion and literature. Arabic is spoken by almost 200 million people in more than twenty two countries.

Arabic Text

The most striking difference between Arabic and other languages is that Arabic text is usually presented without vowels and other diacritical marks. Vowels, when used, are presented by diacritical marks, placed above or below the character. The process of adding vowels and other diacritical marks to Arabic text can be called Diacritization or, for simplicity, Vowelization. Vowelization defines the sense of each word, and how it will be pronounced. However, the use of vowels and other diacritics has lapsed in modern Arabic writing. It is, therefore, the norm for an entire formal Arabic newspaper to have only a dozen or so thoughtfully-used vowels and diacritics placed only where there is not enough context to know what is intended.

These zero-width optional elements are used occasionally to disambiguate homographs when there is insufficient context for the reader to do so. A good reader anticipates these potential ambiguities and inserts shorts vowels and diacritics as needed, such as to disambiguate the Arabic for "Amman" and "Oman", or to indicate the passive voice. Occasionally one hears professional news announcers pause and backtrack to re-read a passage with a different "vocalization" of a word.

Vocalization

In any vocalized language vowels play an important role since they are-the most prominent and central sound of a syllable. The vowels help us to join consonants to achieve a full sound. In English a, e, i, o and u (also y) are the vowels which are clearly spelled out in a text, whereas in Arabic they are not.

Arabic Vowels and other Diacritics

Arabic has three short vowels:
1. The Fathah sign (ﹶ) represents the "a" sound and is an oblique dash over a consonant like ﹶب
2. The Kasra sign (ﹺ) represents the "i" sound and is an oblique dash under a consonant like ﹺب
3. The Damma sign (ﹸ) represents the "u" sound and is a loop over a consonant that resembles the shape of a comma, like ﹸب

In addition there are three kinds of diacritics:
1. "Sukun", written as a small circle above the Arabic consonant, is used to indicate that the letter is not vowelized. In this patent application we will refer to sukun as "0".
2. "Shadda" is a gemination mark that is placed above the Arabic letters and results in a repetition of the letter at the phonemic level. We will be referring to it here as "~".
3. "Nunation" is expressed by one of three different diacritics (Fathatan, Dammatan, Kasratan). These are placed above the last letter of the word and have the phonetic effect of placing an "N" at the end of the word.

In the remainder of this patent application we will distinguish between vowel signs and other diacritical marks only if it is required for purposes of illustration or in cases of exception. In general, we will refer to both groups of marks as vowels, and will refer to written text that makes use of any vowel signs and/or diacritical marks as vowelized text. In contrast, all other written text is referred to as un-vowelized text or simply as text, which is often used as input to the inventional method.

Problems in Automatic Speech and Natural Language Processing

As mentioned above, almost all written Arabic text—for example all newspaper text—is un-vowelized, which may lead to ambiguity in meaning and different possibilities of pronunciation. A normal Arabic speaker can put vowels "on the fly" while reading to get the intended meaning; readers usually apply their linguistic and semantic knowledge to resolve ambiguities.

While humans perform quite well on this task, the omission of vowels in written text leads to some serious problems for automatic speech and language processing systems. For example, the language model component of an automatic speech recognition system requires vowelized text in order resolve ambiguities and to achieve very high transcription accuracy.

Even more obvious is the fact that on-line vowelization of written text is indispensable for a text-to-speech (TTS) system, in order to correctly pronounce the input text.

For the construction of such speech technology components, current state-of-the-art speech recognition applications usually use manually vowelized text, which is tedious and error prone to create and results in less reliable components.

State-of-the-art TTS systems, as represented simplified in FIG. 1 may be used for a large variety of applications 10A, 10B, etc. Examples are telephony applications used for call-centres and elsewhere. A text written in a Semitic language is input into a vowelization tool 13, which is used and developed by a plurality of highly skilled developers 14, who apply an ensemble of morpho-syntactical rules, usually including a determination of etymological roots of text components, the determination of casus, numerus, and genus, and part-of-speech tagging, i.e. the identification of word types (nomen, verbum, adjective, etc.). Usually, also a semantic analysis is performed in order to determine the meaning of a word in its context. By applying this ensemble of rules the missing vowels and other diacritical marks are inserted into the original input text.

Those rules are depicted by reference sign 15, and an exemplary plurality of exceptions is depicted with reference sign 16 in order to illustrate the empiric character of this rule collection. Rules and large exception dictionaries are often stored electronically as part of the front-end component 18 of a text-to-speech (TTS) system. As depicted in FIG. 3, which is a schematic block diagram representation illustrating some more details of the prior art TTS conversion, the TTS-frontend also generates a phonetic description (also known as "baseform") and a prosodic description (aka intonation contour) of the input text.

The TTS back-end component 19 generates synthetic speech signals 11 from the above-mentioned phonetic and prosodic description for outputting via a speaker system.

The above-mentioned TTS engine including the front-end 18 and back-end 19 thereof is implemented in prior art usually as a component of a prior art voice server, which is schematically illustrated in FIG. 2. As FIG. 2 illustrates, such prior art voice server further comprises a speech recognition engine 22, as most of the applications are operating fully bidirectional, i.e. they convert speech to text and vice-versa. Further, the voice server 22 comprises a voice browser 20 for rendering the acoustic or textual information, connected to a telephony stack 26, which handles the incoming calls. A JAVA speech application programming interface (JSAPI) component 25 receives audio signals, words and grammars corresponding to a respective telephone call structure from the voice browser component. The JSAPI component co-operates with the speech recognition engine and the text-to-speech engine 22 as it is known from prior art. The present invention basically improves the TTS engine 18, 19 and improves the training, the speech recognition engine 22 is based on.

Further, according to FIG. 2, the prior art environment comprises an interface to a co-operating web application server 24 which may be implemented on a PC system, either desktop or portable, possibly together with the before-mentioned applications or the respective application components and the voice server itself, or which may run in a client-server environment.

As mentioned above, the use of un-vowelized text is common in written Arabic. An average Arabic speaker or reader will add vowels on the fly while reading to get the intended meaning. In contrast, the use of un-vowelized text by a computer program that performs any kind of natural language processing is almost impossible, because such text is highly ambiguous: without a mechanism for vowelization, the system would simply behave unpredictable.

For an illustration of the problem, consider the following example that—for the purpose of explanation—is given in English: Imagine that English in its written form uses only consonants, but no vowels. In this case, the two words "write" and "wrote" will both be written as "wrt". When "wrt" appears in a sentence, a reader will have at least two choices:
(1) add "i" and "e" and pronounce it as "write"
(2) add "o" and "e" and pronounce it as "wrote"

A prior art morphological analyzer can only propose these two solutions, and more information is needed for disambiguation. For example, the consideration of the syntactic sentence structure can be used to obtain the correct vowelizations ("I will write a letter." vs. "Yesterday I wrote a letter.").

While this simple example illustrates the ambiguity problem of non-vowelized text, Arabic has the additional problem of non-diacritized text, where the same vowelization can lead to different meanings dependent on additional diacritical marks. For example, in Arabic a triliteral word "K T B" could have any of the following semantics:
(1) Using the vowel pattern "a a a" will result in "KaTaBa", which has the meaning "He wrote".
(2) An additional gemination mark (shadda) will result in the pattern "a ~a a" and the vowelized text is "KaT~aBa", which has the meaning "He has forced someone to write".
(3) The "o e a" vowel pattern results in "KoTeBa" ("It has been written").
(4) Similar to (2), the use of a gemination mark will result in the "o ~e a", and the vowelized text is "KoT~eBa" ("He has been forced to write").
(5) Finally, the vowel/diacritics pattern "o o 0" transforms the consonant cluster into "KoToB0" ("the books").

In prior art, a morphological analyzer analyzes the word "K T B" and will offer the 5 different vowelization patterns and solutions above; ambiguity in this case must be resolved from a combination of syntax and semantics according to the pre-established collection of rules 15, mentioned above with reference to FIG. 1. These rules 15, including the empirically found exceptions 16 are, however, disadvantageously difficult to maintain up-to-date, or to extend to a new application due to the productive nature of any "living" spoken language.

Further disadvantages of prior art are due to the fact that the development of morphological and syntactical analyzers requires a lexicon database. The lexicon should cover the entire language, and therefore its collection is not a trivial task, and requires the expertise of computational linguists. In previous efforts done by IBM Cario Scientific Center (1987) morphological, syntactical, and some semantical features for about 5700 Arabic roots have been collected.

Morphology is important because a "living" language is "productive": In any given text one will encounter words and word forms that have not been seen before and that are not in any precompiled dictionary. Many of these new words are morphologically related to known words. It is important to be able to handle morphology in almost all languages, but it is absolutely essential for highly inflected languages.

The major types of morphological processes are inflection, derivation, and compounding: Inflections are the systematic modifications of a root form by means of prefixes and suffixes to indicate grammatical distinctions like singular and plural. Derivation is less systematic. It usually results in a more radical change of syntactic category, and it often involves a change in meaning. Compounding refers to the merging of two or more words into a new word. Further, words are organized into phrases, groupings of words that are clumped as a unit. Syntax is the study of the regularities and constraints of word order and phrase structure.

The above-mentioned prior art morpho-syntactical analyzer is able to handle only two types of the Arabic sentences, namely the Arabic verbal and nominal sentences, and generating the corresponding parse trees. These two sentence types can also be vowelized completely with a certain degree of ambiguity that needs to be resolved through a semantical analyzer.

Sakhr (www.sakhr.com), a Middle East based company, has developed a system for automatic diacritization of Arabic that depends on various levels for language processing and analysis. Starting from a morphological level and ending with disambiguation of word meanings, the method relies on an extensive basic research in the area of Natural Language Processing (NLP) and large linguistic databases that Sakhr has developed over many years. Disadvantageously, in this approach the databases can be maintained up-to-date only with a large amount of manual work and highly skilled staff due to the "productive" nature of any language, as it was described above, and due to the even more problematic fact that Arabic is a highly inflected language.

1.3. Objectives of the Invention

It is thus an objective of the present invention to help overcome the above mentioned disadvantages.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the broadest aspect of the invention a method for converting an input text given in an incomplete language into speech is disclosed, in which method a computer-aided graphem-phonem conversion is used, which is characterized by the steps of:

a) using statistical methods, preferably including stochastic language models and decision trees, for enriching said input text with missing information—which may be desired for a full understanding of the input textb) subjecting the completed input text to said grapheme-phoneme conversion to produce a phonetic transcription of said input text, c) converting said phonetic transcription into synthetic speech.

An "incomplete" language is hereby to be understood as a natural or artificial language, in which text is used, which does not contain a complete syntactic and semantic description of phrases. Thus, there is a lack of information, ie a gap between text in its usual written form and the fully elaborated, disambiguated version thereof, which is necessary for correctly converting said text into speech.

Also, a method for training a speech recognizer with an input text given in an incomplete language and corresponding speech data is disclosed, characterized by the steps of:

a) using statistical methods including stochastic language models and decision trees for enriching input words of said input text with missing information—which may be desired for a full understanding of the input textb) subjecting the completed input text to said grapheme-phoneme conversion to produce one or more phonetic transcriptions of said input text, c) training (state of the art) acoustic models from speech items representing said input text.

An advantageous additional step usable in both before-mentioned methods is done, when the text is completed according to a hierarchy of models giving higher priority to longer chunks of text, ie sentences, then multiword phrases, then words, and finally character groups.

This means in more detail to evaluate a given, pre-compiled so-called "enrichment corpus" for completing said input text of said incomplete language, wherein said corpus comprises a collection of language-specific characters, a collection of relevant character combinations ie words, and a collection of relevant sequences of predetermined character combinations, ie phrases and sentences according to a hierarchical evaluation scheme. This helps to make the inventional method efficient in runtime behaviour and to save storage space.

The core idea of the present invention is based on the assumption that, if a huge vowelized Arabic text corpus—the before-mentioned enrichment corpus—where all possible contexts of Arabic words and hence (implicitly) all possible Arabic sentences occur is available, we can exploit this corpus in order to vowelize any given un-vowelized Arabic text. However, in practise it is neither possible to find nor practical to store such a huge corpus; therefore, we propose to capture the statistics of a respective different corpus on various levels, namely on the sentence level, the phrase level, and the word and character level as well. During the process of automatic vowelization according to the present invention, the main task is to find the longer units first, ie sentences and phrases, and—if not found—fall back to statistical models for shorter units, i.e. words, and finally groups of characters, in that particular order.

In short words the invention provides a method based on an automatic statistical approach for the vowelization of Arabic text that may serve as input to the text-to-speech (TTS) component of a natural language processing system or may be used to improve prior art speech recognition systems during a training phase thereof.

Advantageously, due to its automatic runtime behaviour with no human intervention the inventional method allows the on-line addition of vowels to Arabic text without using any linguistic information and highly-skilled staff.

Statistical methods for the evaluation of the before-mentioned enrichment corpus include N-gram statistics, where N is preferably in the range from 1 to 5 including the interval limits.

In contrast to prior art, in this invention an entirely statistics based algorithm is disclosed for the automatic vowelization of Arabic text. The inventional method is thus a valuable tool for any automatic processing of the Arabic language and can overcome the drawbacks associated with both, the use of manually vowelized text and prior art rule-based vowelization methods.

3. BRIEF DESCRIPTION OF THE DRAWINGS

The present invention is illustrated by way of example and is not limited by the shape of the figures of the drawings in which.

Figure 6:
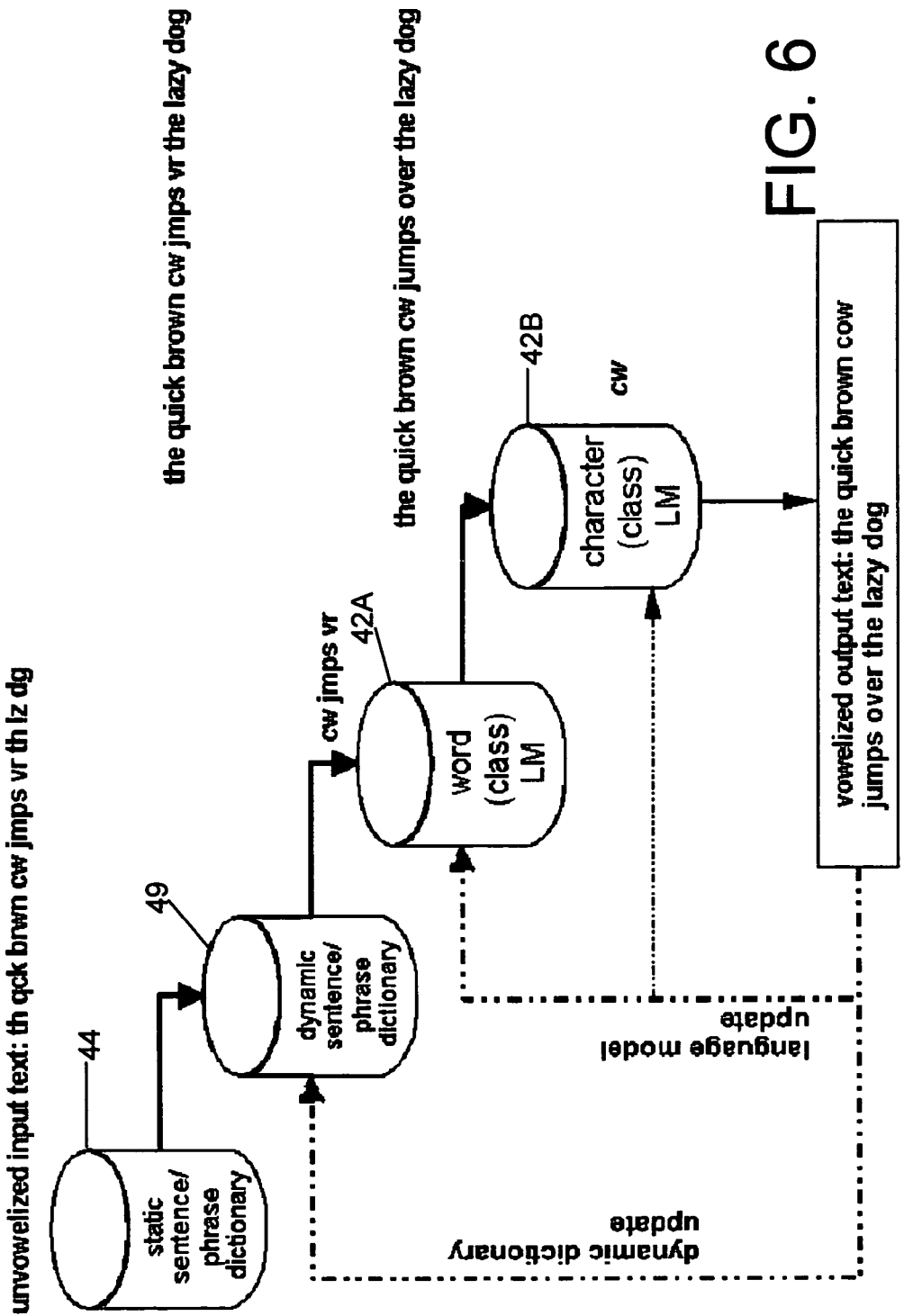
Figure 7:
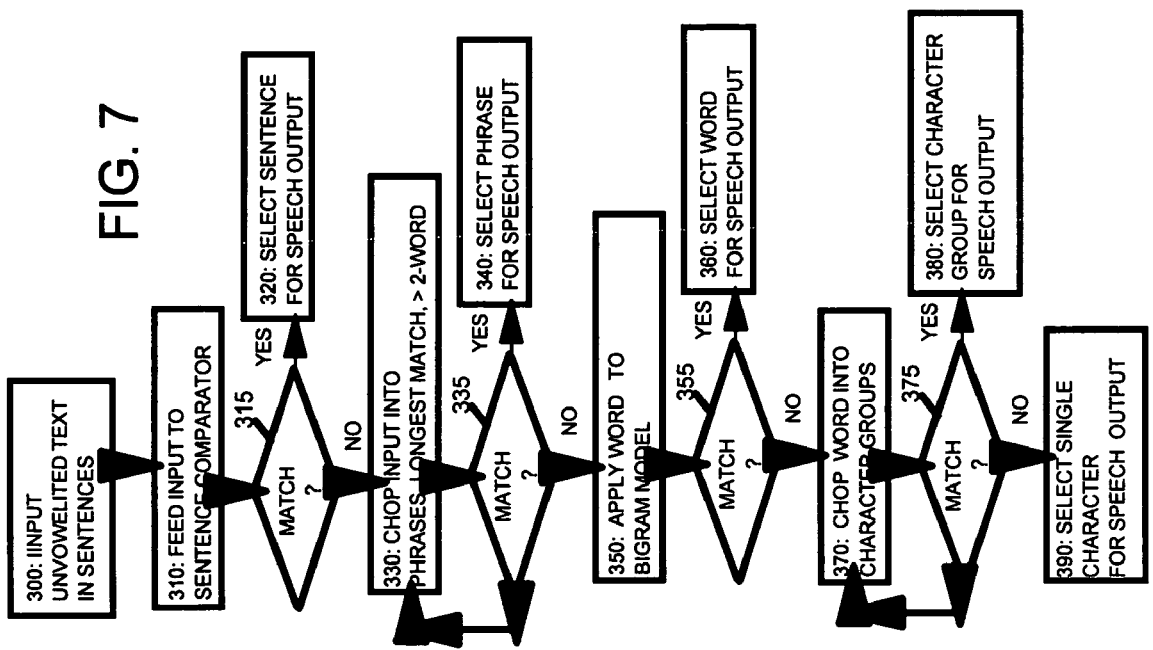

FIG. 6 is a schematic block diagram representation illustrating the runtime vowelization using the inventional hierarchical approach searching for a respective longest match in sentences, phrases, words or character sequences; and FIG. 7 is a schematic block diagram representation illustrating the steps in an exemplary control flow reflecting the before-mentioned hierarchical approach according to the invention;

4. DETAILED DESCRIPTION OF THE PREFERRED EMBODIMENT

Figure 1:
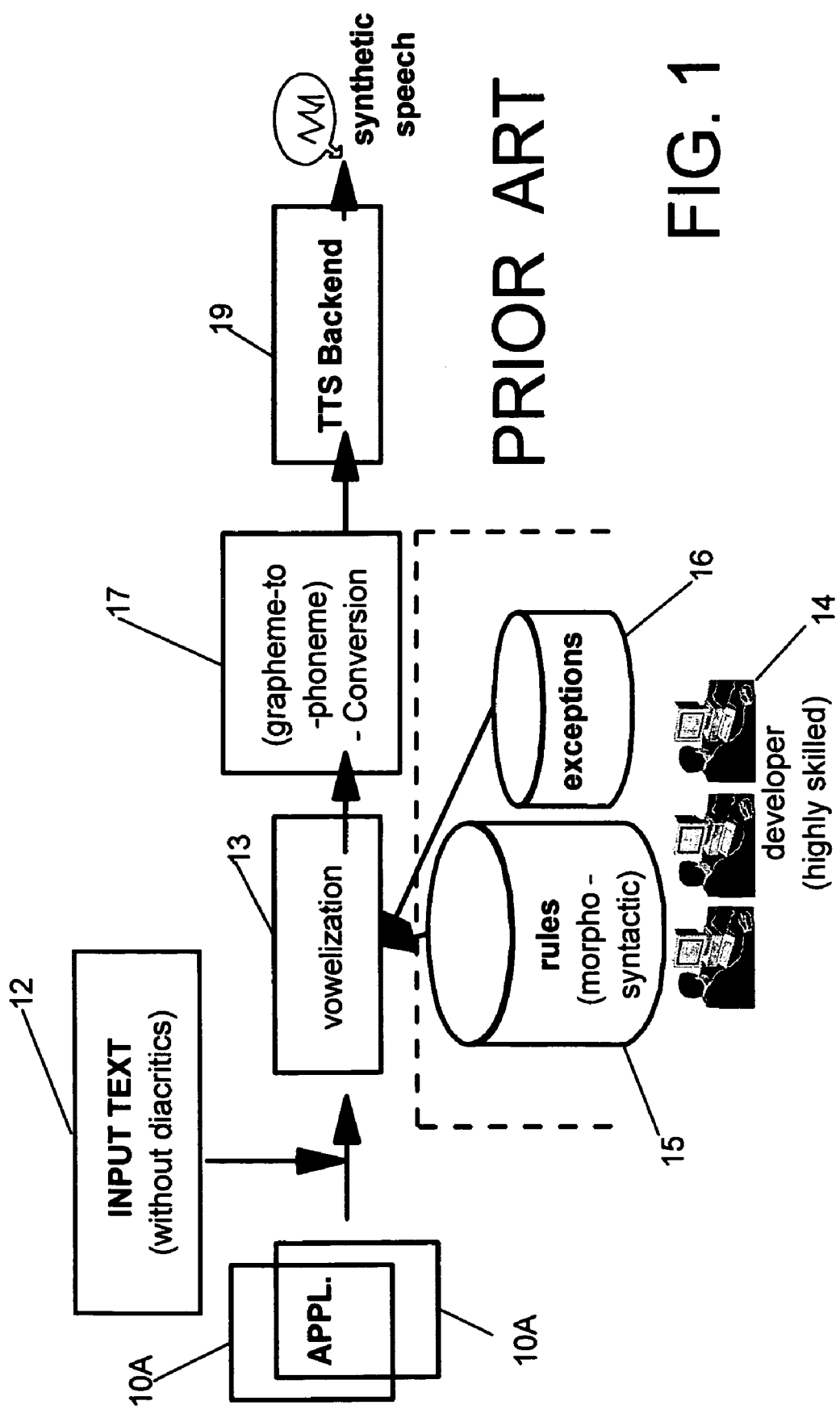
FIG. 1 is a schematic block diagram representation of a prior art text-to-speech (TTS) conversion program using manual vowelization.
Figure 2:
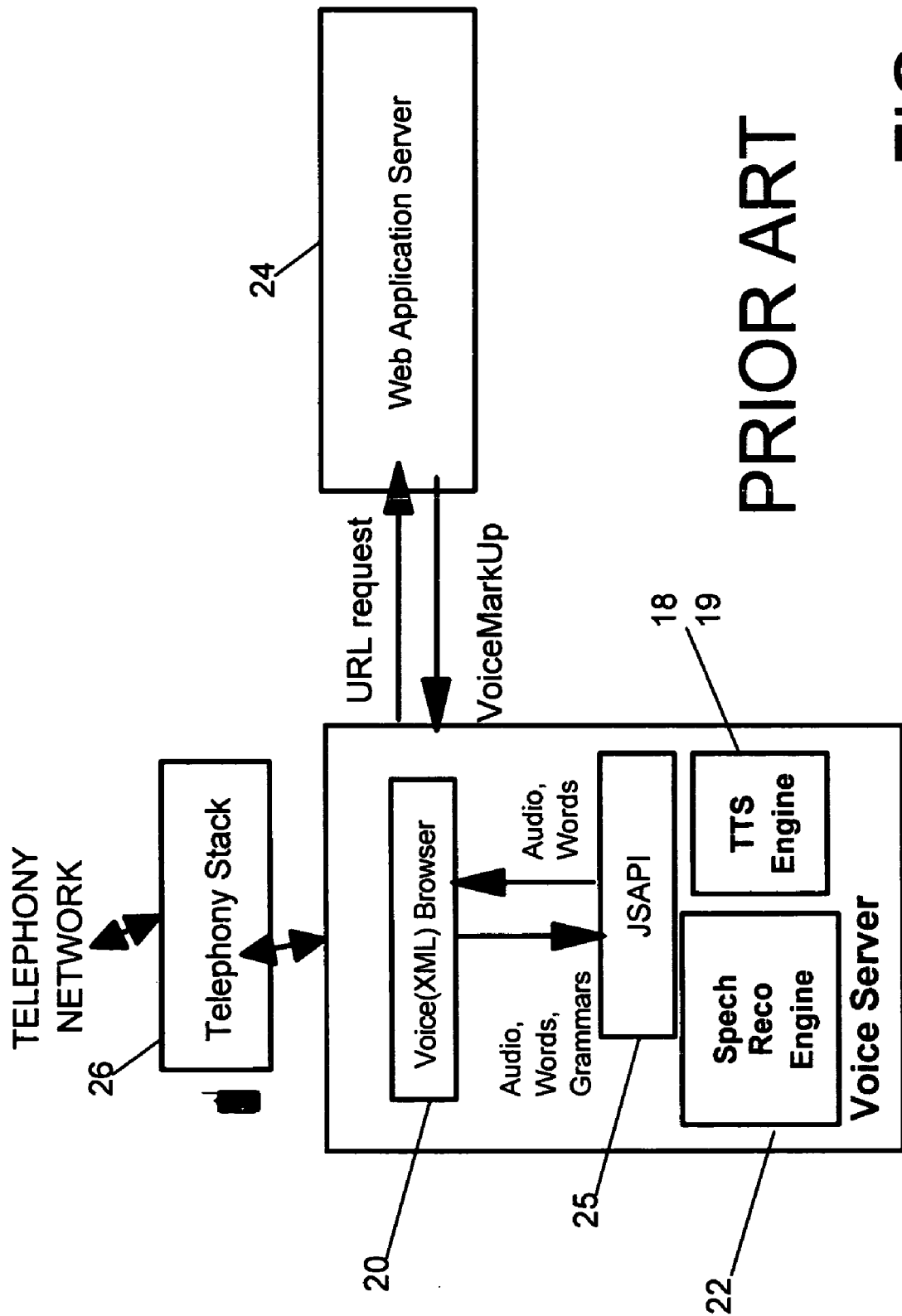
FIG. 2 is a structural, schematic representation of a prior art voice server computer used in a web-based telephony application, in which the inventional method can be advantageously applied.
Figure 3:
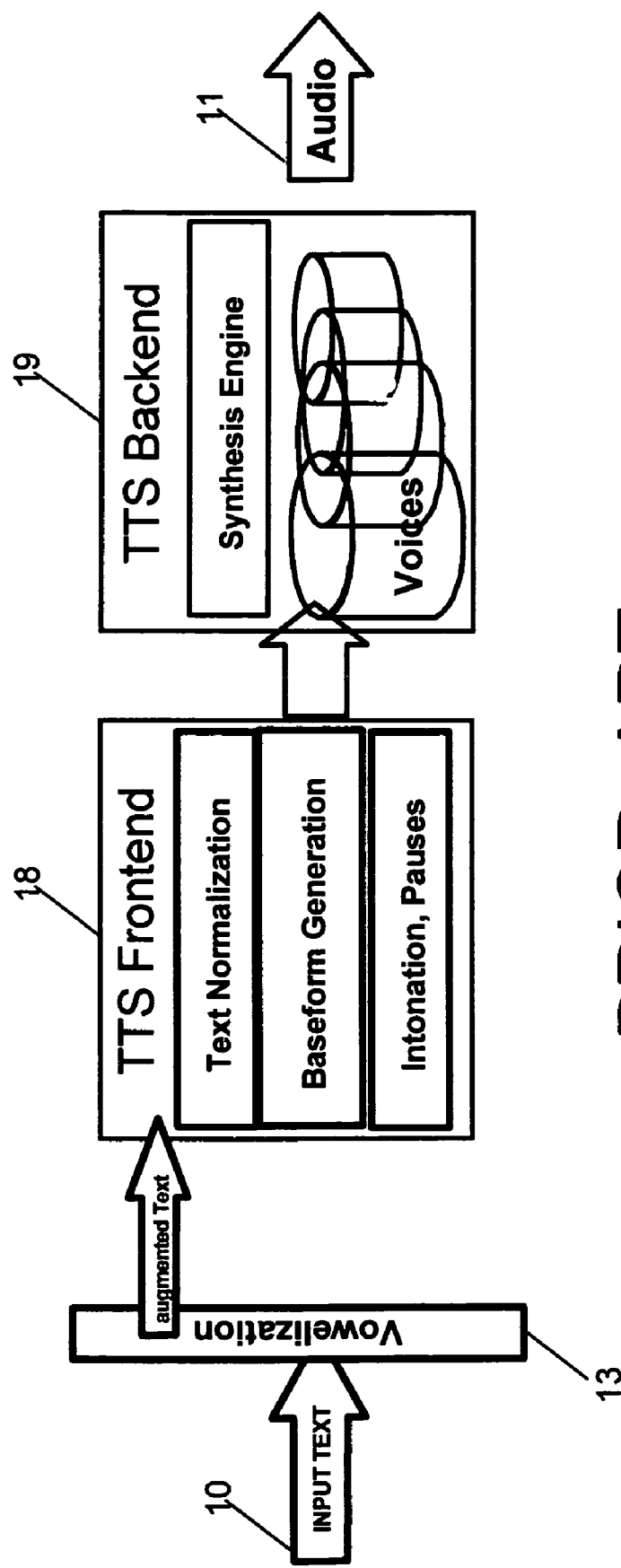
FIG. 3 is a schematic block diagram representation illustrating some more details of the prior art TTS conversion.
Figure 4:
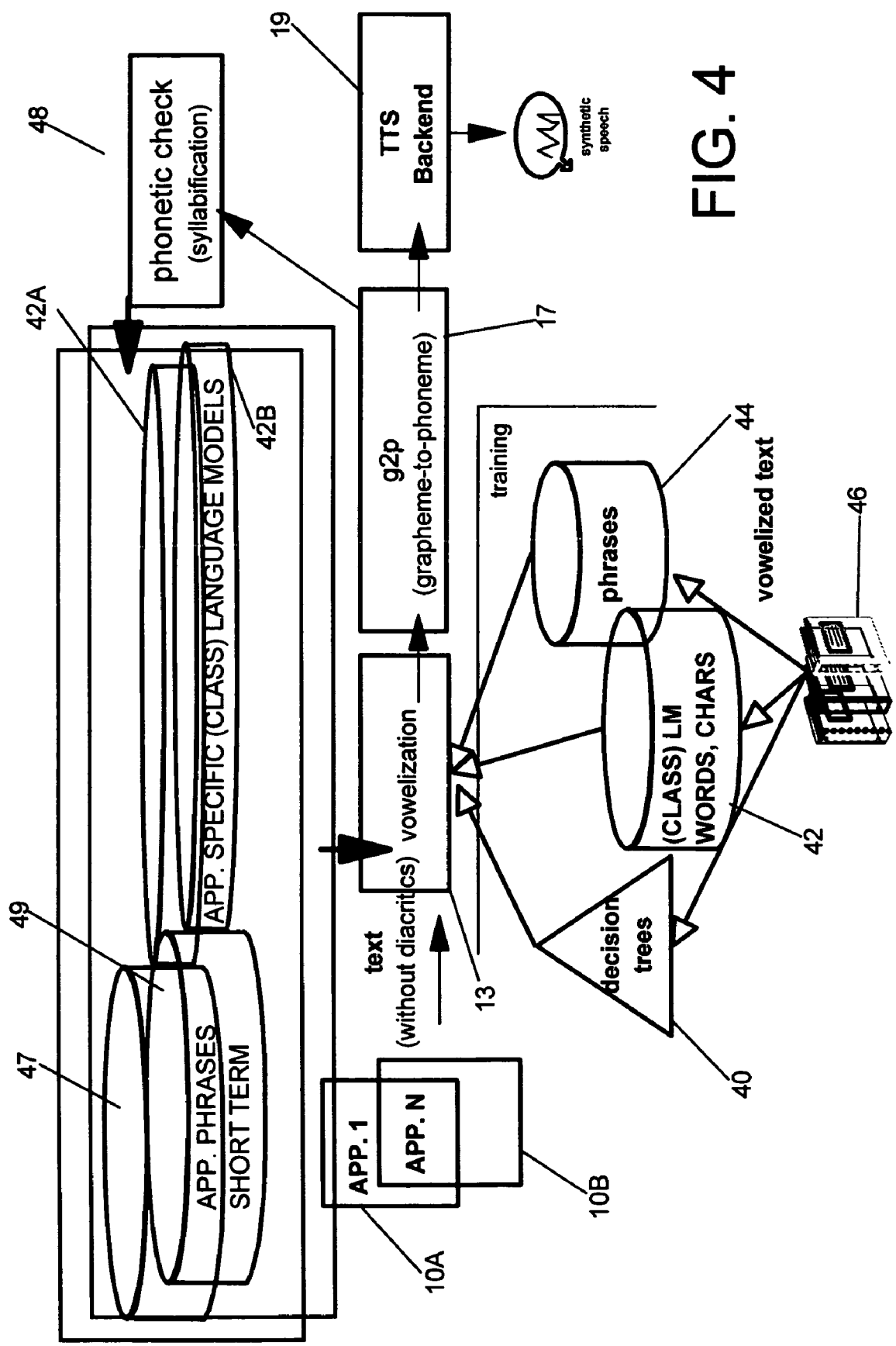
FIG. 4 is a schematic block diagram representation of a text-to-speech (TTS) engine including automatic vowelization according to the invention and showing some architectural details thereof.

With general reference to the figures and with special reference now to FIG. 4 a rough structure diagram is given for the purpose of a clear overview and contrast to prior art telling the skilled reader how the present invention is embedded into the prior art structure shown in FIG. 1. Instead of morpho-syntactic rules developed and maintained in prior art by highly-skilled language experts, the present invention applies automatic vowelization, which needs a training phase, before it can be applied in runtime. This training phase is symbolically depicted with the structural features of decision trees 40, a database 42 comprising language models generally abbreviated in the drawings as LM—for words or characters and/or for classes of words or characters, as well as a database 44 for storing frequently used phrases and sentences. During the training phase yet unvowelized text is vowelized according to the inventional method, checked for correctness and inserted into respective database fields of before-mentioned databases 42 and 44.

Then, the vowelization databases may be used during runtime together with the inventional vowelization algorithms of above-mentioned applications, which is symbolised by the central sequence of blocks 10, 13, 17 and 19, identical to FIG. 1.

An additional preferred feature of the present invention is a phonetic check algorithm 48, which tests after the grapheme to phoneme conversion 17, if a generated phonetic description follows the syllable structure, which is specific for the language in use, ie in this embodiment the Arabic language.

Further advantageously, in order to adapt the contents of the above-mentioned words and phrases databases 42 and 44, respectively, additional short-term databases 47 and 49 and application-specific language models 42A, 42B are filled with correctly tested words and phrases respectively, together with the corresponding unvowelized words or phrases. These databases are preferably operated with dynamic updates and dynamic data delivery to the static words and phrases dictionaries (databases) 42, 44, in order to keep the contents of the dynamic databases small and concise.

Figure 5:
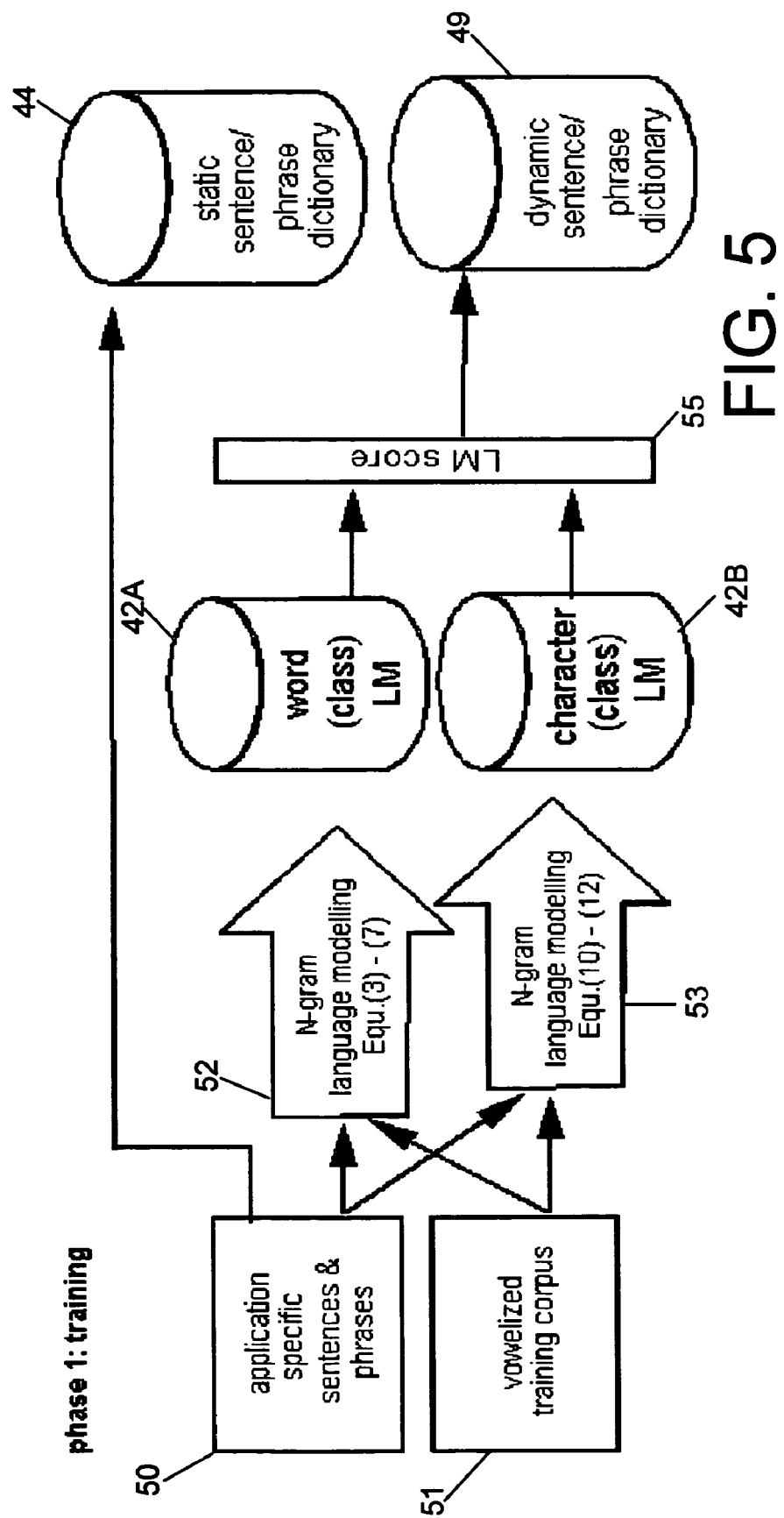
FIG. 5 is a structural block diagram representation illustrating the training phase of the inventional method and referring to the lower part sketched in FIG. 4.

With reference to FIG. 5 an overview representation for the training phase functional components according to this inventional embodiment is given next.

In the training phase vowelized text is basically compared to its unvowelized form, and scores are provided for each of the possible vowelized forms in proportion to the occurrences of a respective vowelized form. Thus, if in said training text a certain first vowelized word has 30 occurrences, and a different, second vowelized form of the same unvowelized text item has only a number of 10 occurrences, then said first vowelized form is awarded a three times higher score than the second one. Thus, for each unvowelized text item, ie sentences, phrases words and character groups smaller than entire words the different vowelized forms are stored together with their respective scores. A full set of such datasets is referred to then as a language model, as it is known from the field of speech recognition in a different context.

Following this principle or similar ones, a relatively large vowelized Arabic text corpus 51 is used to train the different statistical language models, abbreviated as LM, ie the word-level models stored in database 42A, and the character-level models stored in database 42B. It should be added that both models can also be based on class structures, which can be automatically derived with prior art methods. The skillful reader can think of the syntactical class (or part-of-speech) of a word (like e.g. noun, verb, etc.) as an example; character classes can be derived, for example, by grouping individual characters that represent similar speech sounds when spoken (e.g. plosive sounds, nasals, fricatives, etc.).

The before-mentioned data sources 50 and 51 are used as input for the training of stochastic language models, which uses preferably the formulae given later below with equations (3) to (7) and equations (10) to (12).

Further, a pre-established, application-specific set of sentences and phrases is stored in the static sentence and phrase dictionary 44.

These modelling methods result in the before-mentioned word and character language models and respective filled databases 42A and 42B. Preferably, these language models are also used to provide scores 55 for the selection of sentences and phrases that are stored in a dynamic dictionary 49.

Those scores are provided on each level (sentence, phrase, word, character), and are initially computed in the training phase, but are repeatedly computed during runtime for an update of the dynamic dictionary as it is described in more detail further below. Further details for the application of the above-mentioned formulae are given later below.

The vowelization phase can be started after the training phase has led to dictionaries and stochastic models having a satisfying content good enough for the specific needs of the underlying application. In this phase vowels are added to non-vowelized sentences, phases, words or character groups. In particular, first, the sentence/phrase models are utilised, if negative, then word models and finally character models. As an alternative to the stochastic N-gram language model, decision trees may by used, which is symbolized by the "decision tree" symbol 40 in FIG. 4.

FIG. 6 shows a schematic block diagram of the vowelization phase (run-time), using a slight variant of the well-known English sentence "The quick brown fox (here: cow) jumps over the lazy dog" (symbolized in English language in order to improve clarity of the invention) in order to demonstrate the hierarchical (decision tree) approach of the invention.

In particular, and with additional reference to FIG. 7, showing the control flow of the respective inventional method, the unvowelized Arabic text symbolized by the English transcription thereof is first fed, steps 300, 310, to a sentence comparator accessing the static sentence database 44, to check, step 315, if the whole sentence already exists in the reference sentences database. In case of a match—see the YES branch of 315, the vowelized sentence is retrieved for selection to speech output; otherwise—see the NO branch of 315, the sentence is passed to the phrase vowelizer, where it is chopped, step 330, into phrases that are compared to the phrases in the databases. A scoring technique is preferably used in order to favour the chunks of longer phrases relative to shorter ones. In case of a respective match of a phrase—see the YES branch of decision 335, the vowelized phrase is retrieved for selection to speech output; otherwise—see the NO branch of decision 335, a feedback to chop step 330 is done, in order to match a shorter phrase, cutting preferably the word at the current end of the phrase off from evaluation. This procedure is continued until phrases are matched, step 340, and picked for selection to speech output, or at least and preferably words are left unvowelized.

At the end of this stage, these unvowelized words will be fed, step 350 to a word vowelizer, which consults a respective N-gram—here a bigram—word vowelization model and outputs the vowelization of the word, step 360, if found, step 355.

Otherwise, ie, in case there will be any words left out non-vowelized, these words will be fed to a character vowelizer, where a word is chopped into characters, and N-gram character language models or decision trees are consulted to obtain a vowelization. Again, longer groups of characters are preferred for priority vowelization, according to the before-mentioned longest match principle. Thus, for each input sequence of characters the vowel sequence having a highest posterior probability is determined, and is issued at step 380, or, if no group of characters is found, a single character is output for synthetic speech output, step 390.

Optionally, the retrieved sentences phrases and words are fed back to the dynamic respective databases 47, 49, respectively, see back to FIG. 4, in order to store it in a cache status of quickly repeatable access, and the scores are updated in those databases preferably according to the degree how often they were found.

In summary, in this inventional embodiment the vowelization is performed on four levels; first on the sentence level, then on the phrase level with an optional focus on bigram evaluation, then on the word level and finally on the character level. All evaluation is done on a fully automized computer program level. The details of the vowelizations on the respective levels will be described in more detail next below. Such implementation details are of course only exemplary in nature.

Details of the Sentence and Phrase Vowelizer Embodiment

The main task of the sentence and phrase vowelizer is to provide a highly accurate vowelization of entire sentences or phrases that are frequently used and/or critical for a given application. For a fast lookup during application runtime, these sentences and phrases are stored in their unvowelized form in tree-structured dictionaries. The vowelized text can be obtained from the trees' leaves that are reached by traversing the trees given the unvowelized input text.

Advantageously, two different types of sentence and phrase vowelizers are provided. One or more static dictionaries will provide vowelized text for a small set of application-specific sentences and phrases that are always needed and always known to the system. For example, the Text-to-Speech output component of a natural language interface will always need to synthesise a couple of sentences or phrases, such as greeting (e.g. "Welcome to the IBM customers helpline! How may I help you?") or goodbye (e.g. "Thank you for using the IBM customer's helpline! Goodbye!"). These sentences and many more of them can be selected and vowelized by the evaluation of a representative training corpus using a prior art stochastic language model technology or they are supplied by an application developer.

A dynamic or cache dictionary will store vowelizations for sentences and phrases that are likely to be used by a particular application. Again, stochastic language modelling can be used to provide an initial set of phrases and their vowelization, but it is important to understand that the content of the dynamic dictionary and the associated vowelization can vary over time due to the update of the initial language model. Promising methods for the replacement of a phrase or sentence from the dynamic dictionary are: replacement of the most recently used entity, replacement of the least frequently used entity, replacement of the least probable entity, or random replacement of an entity.

Details of the Word Vowelizer Embodiment

The main task of the word vowelizer is to map a given unvowelized word onto a vowelized word. The basic inventional approach of a statistical approach to word vowelization will be described in more detail next below.

Denoting the sequence of unvowelized words as $U=(u_1, \ldots, u_n)$, and the sequence of vowelized words as $V=(v_1, \ldots, v_n)$, it is a well known fact from statistical pattern recognition theory, that a decision for the sequence $$V^* = \arg\max_v \{P(V|U)\} \tag{1}$$

minimizes the average expected error. Applying Bayes' rule we can rewrite equation (1) as:

$$V^* = \arg\max_V \{P(V, U)/P(U)\} \tag{2}$$
$$= \arg\max_V \{P(V) \cdot P(U \mid V)/P(U)\}$$

Because of the huge number of possible word sequences, it is impossible to reliably estimate and efficiently store the sequence's probabilities $P(v_1, \ldots v_n)$, $$P(v_1, \ldots, v_n) = P(v_1) \cdot \prod_{i=2}^{n} P(v_i \mid v_1, \ldots, v_{i-1}) \tag{3}$$

even for limited sized vocabularies and short sequence of (vowelized) words. For example, given a vocabulary Q of a size $|Q|=20000$ and a sequence length of $n=6$ would require to estimate and store approximately $10^{25}$ probabilities. It is therefore common practice in stochastic language modeling to consider only a limited history of a word $v_i$ and build equivalence classes over these histories to approximate the probability of a sentence. The most popular approaches are:

the unigram language model, where all histories are equivalent:

$$P(v_1, \ldots, v_n) = P(v_1) \cdot \prod_{i=2}^{n} P(v_i) \tag{4}$$

the bigram language model, where histories are equivalent, if they end in the same word:

$$P(v_1, \ldots, v_n) = P(v_1) \cdot \prod_{i=2}^{n} P(v_i \mid v_{i-1}) \tag{5}$$

the trigram language model, where histories are equivalent, if they end in the same two words:

$$P(v_1, \ldots, v_n) = P(v_1) \cdot P(v_1 \mid v_2) \cdot \prod_{i=3}^{n} P(v_i \mid v_{i-2}, v_{i-1}) \tag{6}$$

Note that by these approximations the number of probabilities to be estimated from a training corpus reduces significantly, e.g. to approximately $4 \cdot 10^8$ for a vocabulary size of $|Q|=20000$ for a bigram language model. Both, a further reduction and a better reliability for the prediction of text from unseen domains can be achieved by using a set of pair wise disjoint word classes, e.g. parts of speech, rather than words. For example, when using a set of 256 classes for a vocabulary of $|Q|=20000$ words, the number of parameters for the bigram class language model reduces to only 65536. It is also state of the art in stochastic language modeling to use n-gram mixture language models, which compute the probability of a sequence V as a weighted sum of (arbitrary) language models, $$P(v_1, \ldots, v_n) = \sum_k \omega_k P_k(v_1, \ldots, v_n) \tag{7}$$

where $P_k$ denotes the probability estimated by the k-th language model, and the condition $$\sum_k \omega_k = 1$$

holds.

Using a word bigram language model (cf. Equation (5)) for the estimation of $P(v_1, \ldots, v_n)$, assuming that the vowelization of $u_i$ depends only on $v_i$, and taking into account that the maximization is independent of $P(U)$, the joint probability in Equation (2) can be rewritten as:

$$V^* = \arg\max_V \left\{ P(v_1) \cdot \prod_{i=2}^{n} P(v_i \mid v_{i-1}) \cdot P(U \mid V) \right\} \quad (8)$$

$$= \arg\max_V \left\{ P(v_1) \cdot \prod_{i=2}^{n} P(v_i \mid v_{i-1}) \cdot \prod_{i=1}^{n} P(u_i \mid v_i) \right\}$$

According to the last line of Equation (8), the probabilities that must be estimated according to the invention from the vowelized corpus are the probabilities for each word of the corpus $P(v_i)$, the word-to-word transition probabilities $P(v_i|v_{i-1})$, and the probabilities $P(u_i|v_i)$ that a vowelized word $v_i$ generates the unvowelized word $us$. For that purpose, a rich set of maximum likelihood methods for the estimation and smoothing of n-gram probabilities are available from the literature. Algorithms that efficiently search for the sequence V* can also be found in the literature; a dynamic programming based Viterbi beam-search or a stack search algorithm (A*-algorithm) are two frequently methods used therefore.

While in Equation (8) the idea of statistical vowelization was demonstrated using a single-word bigram language model, we propose the use of any n-gram language model, either word or class based, and the use of any combination of such language models according to Equation (7). Furthermore, we propose the use of domain specific vowelized text corpora for parameter estimation that allow obtaining more accurate vowelizations for a particular application. Further, we propose the dynamic update of parameters during the lifetime of the application by means of so-called cache language models.

Details of the Character Vowelizer Embodiment

The character vowelizer according to this preferred embodiment of the invention is used for the vowelization of unknown words, ie. unvowelized words (or sequences of characters) $u_i$ for which no vowelized form $v_i$ is observable in the training corpora.

Let $L=(l_1, \ldots l_n)$ denote a sequence of letters of length n, where $l_i$ denotes the letter in the i-th position of an unvowelized word, let $S=(s_1, \ldots, s_n)$ denote a sequence of vowels, and let $S=(S_1, \ldots, S_{|S|})$ denote the set of Arabic vowels (including the diacritical marks). Furthermore, like in the examples given in the introductory section for the purpose of explanation assume that Arabic words v are written using the usual in-line notation of Western languages, rather than putting vowels above or below the consonants, i.e. $v=l_1 s_1 l_2 s_2 \ldots l_n s_n$.

Again, we determine the best sequence of vowels for a given set of letters as the sequence having maximum probability given the observed sequence of letters:

$$S^* = \arg\max_S \{P(S \mid L)\} \quad (9)$$

$$= \arg\max_S \{P(S, L) / P(L)\}$$

$$= \arg\max_S \left\{ \prod_{i=1}^{n} P(s_i \mid s_{i-1}, \ldots, s_1, L) / P(L) \right\}$$

Under the assumption that the i-th vowel depends only on L, but not on the i−1 previous vowels, and taking into account that the search in Equation (9) does not depend on $P(L)$, the application of Bayes' rule gives the intuitive form $$S^* = \arg\max_S \left\{ \prod_{i=1}^{n} P(s_i \mid s_{i-1}, \ldots, s_1) \cdot P(s_i \mid L) / P(s_i) \right\} \quad (10)$$

Following the argument in the previous section, cf. Equations (3)-(6), the vowel sequence probability has to be computed from a limited history, i.e.: $P(s_i|s_{i-1}, \ldots, s_1) = P(s_{i-1}, \ldots, s_{i-N+1})$, and the N-gram language modelling techniques described further above can be used.

A similar argument holds for the estimation of $P(s_i|L)$: Since there are far too many letter sequences of length n, a limited context has to be used in order to obtain reliable estimates. For that purpose, we preferably limit L to the K letters that succeed and follow the letter $l_i$ and compute $$P(s_i = S_k \mid L) = P(s_i = S_k \mid l_{i-K}, l_{i-K+1}, \ldots, l_{i-1}, l_i, l_{i+1}, \ldots, \quad (11)$$

$$l_{i+K-1}, l_{i+K})$$

$$= \frac{C(l_{i-K}, l_{i-K+1}, \ldots, l_{i-1}, l_i, S_k, l_{i+1}, \ldots,}{\sum_{s_j \in S} C(l_{i-K}, l_{i-K+1}, \ldots, l_{i-1}, l_i, S_j, l_{i+1}, \ldots,}$$

$$\frac{l_{i+K-1}, l_{i+K})}{l_{i+K-1}, l_{i+K})}$$

where $C(.)$ counts the occurrences of its argument in the training corpus. It should be noted that the corpus used for the training of the character vowelizer is not necessarily the same as for the word vowelizer. While the latter may be more application-specific, the former may be designed to cover a broader set of vowelization patterns.

Another advantageous option is to include the already inserted vowels into the stochastic model. In this case Equation (11) becomes $$P(s_i = S_k \mid L, s_1, \ldots, s_{i-1}) = P(s_i = S_k \mid l_{i-K}, s_{i-K}, \quad (12)$$

$$l_{i-K+1}, s_{i-K+1}, \ldots, l_{i-1}, s_{i-1}, l_i, S_k,$$

$$l_{i+1}, \ldots, l_{i+K-1}, l_{i+K})$$

$$= \frac{C(l_{i-K}, s_{i-K}, l_{i-K+1}, s_{i-K+1}, \ldots, l_{i-1},}{\sum_{s_j \in S} C(l_{i-K}, s_{i-K}, l_{i-K+1}, s_{i-K+1}, \ldots,}$$

$$l_{i-1}, l_i, s_{i-1}, l_i, S_j, l_{i+1}, \ldots, l_{i+K-1}, l_{i+K})$$

A further reduction of the number of parameters can be achieved by either the creation of letter classes, or by the clustering of similar letter contexts. The rational behind the latter is that some letter sequences will predict the same vowel or at least will behave similar. Decision trees and maximum entropy methods that are well documented in the statistical speech recognition literature will be used for this purpose.

Finally, Equation (10) requires a search algorithm that finds the best sequence of vowels among all candidate sequences. A Viterbi-like procedure can be readily implemented using $P(s_i|s_{i-1}, \ldots, s_{i-N+1})$ as transition probabilities, and $P(s_i|L)/P(s_i)$ as output probabilities.

Further, advantageously, either an A* search algorithm or a N-best implementation of the Viterbi—search can be applied to give the N-best vowel sequences; see Reference 4 for a detailed description of state-of-the-art search techniques. Then, in a post-poned evaluation step, an application-specific best-hit-selector may select the best match and provide an application specific resolve of ambiguities.

Optional Phonetic Check:

The final vowelized text is passed to a phonetic transcriber, where the phonetic baseform of each word is obtained. The main idea here is to check the correctness of the obtained consonant-vowel-sequences by exploiting the fact that the syllabic structures in Arabic language are limited in number and easily detectable;

Every syllable begins with a consonant /C/ followed by a vowel /V/ which is called, sometimes, the nucleus of the syllable. These features facilitate the process of syllabification. In case the syllabification does not work for a phonetic transcription of a word, this means that the vowels sequence is not correct and the sequence should be fixed, e.g. by removing it from the n-best list of candidate vowelizations.

The present invention can be realized in hardware, software, or a combination of hardware and software. A vowelization tool according to the present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

It should be understood that a voice server improved according to the present invention may be operated in cooperation with a client computer system via an electronic network, e.g. Intranet or Internet, or also as a "stand-alone" system cooperating with an analogue or digital telephony interface and respective telephony applications.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:
a) conversion to another language, code or notation;
b) reproduction in a different material form.

The invention claimed is:

1. A method of supplementing an input text given in an incomplete language with missing information, the method comprising:
    enriching said input text given in an incomplete language with the missing information using at least one processor programmed to implement a first statistical method configured to operate on a first type of linguistic unit and a second statistical method configured to operate on a second type of linguistic unit, wherein the enriching comprises applying the first statistical method to the input text to generate an intermediate result, and after the first statistical method has been applied, applying the second statistical method to at least a portion of the intermediate result to generate an enriched representation of the input text.

2. The method according to claim 1, wherein said first statistical method and/or second statistical method includes applying at least one stochastic language model and/or decision tree.

3. The method according to claim 2, wherein said at least one stochastic language model includes an N-gram language model, wherein N is preferably in the range N=1, . . . 5.

4. The method according to claim 2, further comprising:
    updating at least one dictionary and/or the at least one stochastic language model with new words, phrases or sentences.

5. The method according to claim 2, further comprising:
    updating at least one dictionary and/or the at least one stochastic language model with feedback information reflecting the actual use of selected words, phrases or sentences.

6. The method according to claim 1, wherein the input text lacks at least some vowels, and wherein the enriched representation of the input text includes the at least some vowels.

7. The method according to claim 6, wherein the incomplete language is a Semitic language.

8. The method according to claim 7, further comprising:
    subjecting the enriched representation of the input text to grapheme-phoneme conversion to produce a phonetic description of said input text;
    testing if the phonetic description of an enriched text element follows a language-specific syllable structure; and
    selecting a different phonetic description for the text element if the phonetic description of the enriched text element does not follow the language-specific syllable structure.

9. The method according to claim 1, further comprising
    evaluating a given enrichment corpus for enrichment of said input text, said corpus comprising a collection of relevant character combinations and a collection of relevant sequences of predetermined character combinations according to a hierarchical evaluation scheme, wherein respective probability values are stored for items in said collections for a best match speech item selection, reflecting the most probable language-specific use.

10. The method according to claim 9, wherein the input text is subjected to sentence phrase level mapping, followed by phrase level mapping, followed by word level mapping, followed by character level mapping.

11. The method according to claim 9, wherein said best match speech item selection is performed using a longest match algorithm.

12. The method of claim 1 further comprising:
    subjecting the enriched input text to said grapheme-phoneme conversion to produce a phonetic description of said input text; and
    converting said phonetic description into synthetic speech.

13. The method of claim 1, wherein the at least some input text on which the first statistical method was applied comprises all of the input text on which the first statistical method was applied.

14. A method for training a speech recognizer with an input text given in an incomplete language and corresponding speech data, the method comprising:
    enriching an input word of said input text given in an incomplete language with missing information using at least one processor programmed to implement a first statistical method configured to operate on a first type of linguistic unit and a second statistical method configured to operate on a second type of linguistic unit, wherein the enriching comprises applying the first statistical method to the input text to generate an intermediate result, and after the first statistical method has been applied, applying the second statistical method to at least a portion of the intermediate result to generate an enriched representation of the input text;

subjecting the enriched representation of the input text to grapheme-phoneme conversion to produce a phonetic description of said input text; and using said phonetic description to train at least one acoustic model to recognize words from said input text.

15. The method of claim 14, wherein the at least one acoustic model is a Hidden Markov Model.

16. A computer system, comprising:

at least one processor programmed to:

enrich an input text given in an incomplete language, with missing information using a first statistical method configured to operate on a first type of linguistic unit and a second statistical method configured to operate on a second type of linguistic unit, wherein the enriching comprises applying the first statistical method to the input text to generate an intermediate result, and after the first statistical method has been applied, applying the second statistical method to at least a portion of the intermediate result to generate an enriched representation of the input text; and convert the enriched representation of the input text into speech.

17. The computer system according to claim 16, wherein the computer system is operable as a voice server computer system connectable in an electronic network and/or a telephony network by a network interface, wherein the voice server computer system is bi-directionally connected with a client voice browser and/or phone, wherein said voice server computer system further comprises:

a voice browser for rendering acoustic, textual input, and/or output information produced by a TTS engine and/or a speech recognition engine; and an application programming interface for filtering information input to said TTS engine and/or said speech recognition engine.

18. A text server computer system, comprising:

at least one processor programmed to:

train a speech recognizer with an input text given in an incomplete language and corresponding speech data; and enrich an input word of said input text with missing information using a first statistical method configured to operate on a first type of linguistic unit and a second statistical method configured to operate on a second type of linguistic unit, wherein the enriching comprises applying the first statistical method to the input text to generate an intermediate result, and after the first statistical method has been applied, applying the second statistical method to at least a portion of the intermediate result to generate an enriched representation of the input text.

19. A non-transitory computer usable medium, encoded with a plurality of instructions-that, when executed by a computer, perform a method of supplementing an input text given in an incomplete language with missing information, the method comprising:

enriching said input text with the missing information using a first statistical method configured to operate on a first type of linguistic unit and a second statistical method configured to operate on a second type of linguistic unit, wherein the enriching comprises applying the first statistical method to the input text to generate an intermediate result, and after the first statistical method has been applied, applying the second statistical method to at least a portion of the intermediate result to generate an enriched representation of the input text.

20. The computer usable medium according to claim 19, wherein the method further comprises:

subjecting the enriched input text to grapheme-phoneme conversion to produce a phonetic description of said input text; and converting said phonetic description into synthetic speech.

* * * * *